(12) United States Patent
Kaplan

(10) Patent No.: US 6,761,920 B1
(45) Date of Patent: Jul. 13, 2004

(54) PROCESS FOR MAKING SHELF-STABLE CARBONATED MILK BEVERAGE

(75) Inventor: Jeffrey Kaplan, Fort Lauderdale, FL (US)

(73) Assignee: Excite Beverage Co. Ltd., Dublin (IQ)

( * ) Notice: Subject to any disclaimer, the term of this patent is extended or adjusted under 35 U.S.C. 154(b) by 0 days.

(21) Appl. No.: 10/407,530

(22) Filed: Apr. 4, 2003

Related U.S. Application Data

(63) Continuation-in-part of application No. 09/757,863, filed on Jan. 11, 2001, now abandoned.

(51) Int. Cl.[7] .............................. A23C 3/02; A23C 9/00; A23C 23/00

(52) U.S. Cl. ........................ 426/399; 426/580; 426/590; 426/477

(58) Field of Search ............................... 426/399, 580, 426/590, 477

(56) References Cited

U.S. PATENT DOCUMENTS

| | | |
|---|---|---|
| 607,362 A | 7/1898 | Graeff |
| 1,570,975 A | 1/1926 | Sweeney |
| 2,394,303 A | 2/1946 | Griesbeck |
| 3,973,048 A | 8/1976 | Sollerud |
| 4,804,552 A | 2/1989 | Ahmed et al. |
| 4,919,960 A | 4/1990 | Ahmed et al. |
| 4,921,717 A | 5/1990 | Ranjith |
| 5,356,651 A | * 10/1994 | Degen et al. |
| 6,163,532 A | 12/2000 | Taguchi et al. |
| 6,455,082 B1 | * 9/2002 | Sher et al. |

FOREIGN PATENT DOCUMENTS

WO    WO 89/02221    * 3/1989

OTHER PUBLICATIONS

Fundamentals of Dairy Chemistry, 3rd Edition, Wong et al. 1988. pp. 752 and 753.*

* cited by examiner

*Primary Examiner*—Anthony Weier
(74) *Attorney, Agent, or Firm*—Malin, Haley & DiMaggio, P.A.

(57) ABSTRACT

An aerated or carbonated milk product drink having a shelf stable pre-heated and pressurized ultra-heat treated milk product which has been carbonated with a gas or gases under pressure and packaged into a container. The milk product may be natural or artificial milk product including dairy products and non-dairy milk products and includes combinations of milk products with other beverages such as fruit juices. The method of producing the shelf-stable carbonated milk product of the present invention comprises injecting under pressure carbon dioxide gas or a mixture of gases into the milk product at low temperature of less than 10 degrees centigrade and high pressure of from 50 kpa to 200 kpa. The carbonated milk product remains carbonated and shelf stable in the package until opened.

27 Claims, 2 Drawing Sheets

PROCESS FOR MAKING SHELF-STABLE CARBONATED MILK BEVERAGE

CROSS REFERENCE TO RELATED APPLICATIONS

This application is a continuation-in-part of Ser. No. 09/757,863 filed Jan. 11, 2001 now abandoned.

BACKGROUND OF THE INTENTION

1. Field of the Invention

The present invention generally relates to food substances, and in particular to beverages. More particularly, the present invention relates to ultra heat treated (UHT) milk drinks which have been carbonated or aerated. Preferred embodiments of the present invention include an ultra heat treated, (UHT) sparkling skim milk including combinations of all ultra heat treated, (UHT) milk and all flavors of ultra beat treated, (UHT) milk, all ultra heat treated, (UHT) fruit juice combinations, ultra heat treated, (UHT) fermented yogurts, ultra heat treated, (UHT) non-dairy products, e.g.: soya, field milk, artificial milk and the like. In addition, the present invention relates to a method of carbonating ultra heat treated, (UHT) milk in aseptic and non-aseptic packaging.

Although the present invention will be described with particular reference to an ultra heat treated, (UHT) milk drink aerated with sterilized and purified carbon dioxide and to methods of carbonating the treated milk, it is to be noted that the present invention is not necessarily limited to this embodiment and the scope of the invention may be more extensive by including within it other beverages aerated with other gases and gas mixtures of varying ratios, such as substitute milk products, for example soya substitutes.

It is to be noted that the use of the general term, ultra heat treated (UHT) milk products include all kinds of ultra heat treated (UHT) milk products whether natural or artificial milk or substitute milk materials, such as for example, whole milk, low fat milk, modified milk, yogurt, and milk products in general including combinations with other beverages such as fruit juices, soy and the like.

2. Description of Related Art

Soft drink sales and sales of aerated and or carbonated beverages in general have over a period of time increased so that not only are more beverages in general being sold but the market share of soft drinks and other carbonated drinks have been increasing at the expense of other types of drinks, such as milk product drinks. In order to increase the appeal of milk as a drink and hopefully to gain an increased market share for milk drinks, particularly in situations away from a refrigerator such as during out-of-home activities, it has been thought that if carbonated or aerated milk was available, this product, because of its similarities to soft drink in appeal, would be successful in view of it being perceived as a more healthy alternative to soft drinks.

The use of ultra heat treated (UHT) milk is well established in the art. It is well known that preheating milk to a temperature of 80 degrees centigrade then heating the pre-heated milk intensively for a short period of time, i.e. for approximately 2–5 seconds, to approximately 130 degrees–150 degrees centigrade followed by instant cooling to a temperature below 80 degrees–90 degrees centigrade will allow milk to become shelf stable. This heat sterilization process which also uses pressure during the ultra heat process kills micro organisms and allows one to keep milk shelf stable without refrigeration. Typical ultra heat treated (UHT) milk formulation processes are set forth in the U.S. Pat. No. 3,973,048 to Tetra Pak Development SA (1976), U.S. Pat. No. 6,163,532 to Parmalat S.p.A. (2000) and in U.S. Pat. No. 4,921,717 to Milk Marketing Board (1990).

Unfortunately, these patents do not relate to the process of carbonating or aerating the ultra heat treated (UHT) milk.

It is to be noted that the carbonation of milk is also well established in the art. Typical milk carbonation formulas arc set forth in U.S. Pat. No. 607,362 to FWH Graeff (1898), in U.S. Pat. No. 1,570,975 to D. Sweeney (1926), in U.S. Pat. No. 2,394,303 to H. Griesbeck (1940), in U.S. Pat. No. 4,804,552 to Dam' Research (1989) and U.S. Pat. No. 4,919,960 to Dairy Research (1990).

Unfortunately, these patents do not relate to carbonating ultra heat treated milk products using a pre-heat and pressure process. In addition, these patents relate to the need of refrigerating the finished milk product and are not shelf stable.

Thus, a need exists for a carbonated or aerated ultra heat treated (UHT) milk beverage which uses a pre-heat/pressure process and does not need refrigeration for the finished product and is shelf stable.

OBJECTS AND ADVANTAGES

Accordingly, several objects and advantages of my invention are:

(A) to provide a method for carbonation of pre-heated and pressurized ultra heat treated (UHT) milk products and combinations of preheated and pressurized ultra heat treated (UHT) milk products and to provide a pre-heated and pressurized ultra heat treated (UHT) carbonated milk product that may also be flavored.

(B) to provide a method to aerate or carbonate pre-heated pressurized ultra heat treated (UHT) milk with suitable gas or mixture of gases in a suitable package whereby the preheated and pressurized ultra heat treated (UHT) milk products remains carbonated in the package for a reasonably long shelf life until opened and no refrigeration is required.

(C) to provide a method of aerating or carbonating pre-heated and pressurized ultra heat treated (UHT) milk comprising of introducing a gas or a mixture of gases such as carbon dioxide into an pre-heated and pressurized ultra heat treated (UHT) milk product under pressure, maintaining the pre-heated and pressurized ultra heat treated (UHT) milk product in an aerated or carbonated state and packaging the aerated or carbonated preheated and pressurized ultra heat treated (UHT) milk product into a package. Typically, the package includes bottles, aluminum cans, cartons of paperboard, aseptic or non aseptic packaging, plastics including PET, polypropylene and mixtures thereof or the like.

(D) to provide a method of aerating or carbonating pre-heated and pressurized ultra beat treated (UHT) milk to include whole milk, low fat milk, total milk solids, non-fat milk, soy or any other product conventionally referred to as milk or dairy product or non-dairy product or artificial milk product or milk substitute product where solid or liquid of any viscosity.

(E) to provide a method of carbonating pre-heated and pressurized ultra heat treated (UHT) milk without the excessive foaming and destabilization caused by sparging with gases at lightly elevated temperatures.

DETAILED DESCRIPTION OF THE INVENTION

Figure 1:
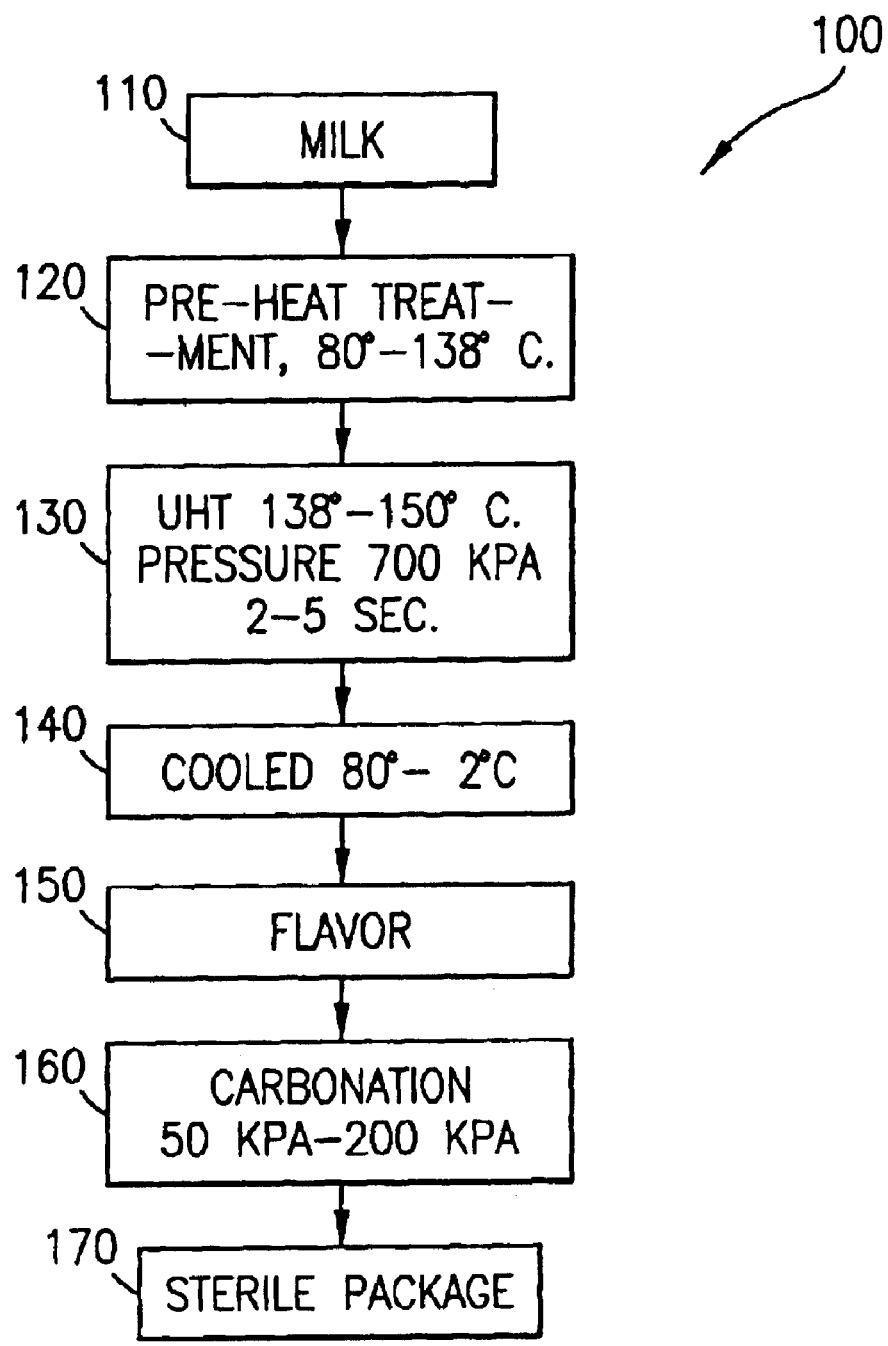
FIG. 1 shows a general flow chart of a typical embodiment of the invention.

In the present invention, the foregoing difficulties are obviated in that there is provided a method to carbonate or aerate preheated and pressurized ultra heat treated (UHT) milk. In a preferred embodiment the carbonated or aerated pre-heated ultra heat treated (UHT) milk is flavored and packaged in sterile bottles, cans or aseptic packaging.

In accordance with the invention, the un-carbonated milk can be processed into preheated and pressurized ultra heat treated (UHT) milk in the usual well know in method in the art. To carbonate and package, the following formulations can be utilized:

EXAMPLE 1

A. (Ultra Heat Treatment)

The milk sample, optionally containing any suitable, conventional or desirable additives is pumped from a stainless steel mix tank to an ultra heat treatment (UHT) plant where in the first stage which is the UHT pre-heater being a plate heat exchange, the milk is indirectly heated from a temperature of from 4 to 8 degrees centigrade to a temperature of about 138 degrees centigrade. After attaining a temperature of 138 degrees centigrade the milk is ultra heated from 138 to 150 degrees centigrade in the UHT heater where it is held at a pressure of 700 KPA or an appropriate pressure for about 2.25 seconds within limits as required to kill microorganisms, pathogens, bacteria and the like.

It is noted the precise conditions can change such as at a temperature of 153 degrees centigrade or similar. Thereupon it is cooled, preferably to below 10 degrees centigrade more preferably to 2 degrees centigrade immediately. At this point a flavoring agent may be introduced preferably from about 0.1% to 3% or as desired.

Thus, at this stage in the regeneration part of the UHT plant, there is now provided a pre-heated and pressurized ultra heat treated optionally flavored milk product which is well known in the art.

B. (Milk Product Carbonating)

The pre-heated and pressurized ultra heat treated (UHT) milk product may be carbonated in the following ways by direct injection of sterilized, purified carbon dioxide gas into the coding chamber section of the plate heat exchange to the stainless steel holding receptacles, refrigerated in aseptic modified pressurized maturing tanks. One form of the carbonator is substantially integral with the UHT plant. Another form of the carbonator may be located remote from the UHT plant.

Briefly, the carbonator which may be especially designed or modified for the present UHT plant or may be a conventional carbonator either as is or modified as required comprises a carbon dioxide inlet for receiving carbon dioxide or a mixture of gases, a filter and an injection nozzle (atomizer).

Typically, the supply of carbon dioxide is from 11 to 56 kg per hour and is typically delivered under pressure range of from 50 KPA to 200 KPA. The carbon dioxide then passes through a filter sterilization to ensure that the carbon dioxide which is used to carbonate the pre-heated ultra heat treated milk is pure, sterilized and aseptic. Typically, the carbon dioxide undergoes gas filtration and sterilization to produce a substantially purified carbon dioxide. After passing through the filter the carbon dioxide is passed to a carbon dioxide injector for actual injecting gaseous carbon dioxide into the pre-heated ultra heat treated milk.

Typically, the injector is an adjustable or otherwise controllable carbon dioxide used in the beer brewing or bottling industry or a modified sparger. Typically, the amount of carbonation is about 3 vols./8 vols. and the carbon dioxide is supplied at a pressure of 60 p.s.i to the preheated ultra heat treated milk. The injection of the carbon dioxide takes place by sparging the pre-heated ultra heat treated milk. An inlet for the carbonator is provided to admit the pre-heated ultra heat treated milk thereto from the remainder of the UHT plant. A further inlet in the form of a conduit is provided for admitting carbon dioxide for atomization. Another example is a sparge pipe provided with an injector for dispersion, in one embodiment the pre-heated ultra heat treated milk product is passed through the injector.

Once the pre-heated ultra heat treated milk has been carbonated at 2 degrees centigrade +/−1 degrees centigrade it is pumped to a pressurized carbonator holding tank where the carbonated product is held under pressure in order to maintain its carbonation to fully mature and saturate. Typically, the carbonator holding tank is maintained at a pressure of 450 KPA and a temperature of 2 to 6 degrees centigrade. The holding tank is provided with a carbon dioxide sensor probe for measuring the amount of the carbonation of the pre-heated ultra heat treated milk product.

In another embodiment, carbon dioxide from the carbonator is used to carbonate the pre-heated ultra heat treated milk product in line in a manner similar to that described using an injector but with the difference that in this case it is in-line sparger. In this embodiment, the carbon dioxide is delivered at a pressure which is compatible with the filling operations, typically of about 450 KPA.

The carbon dioxide is cooled to about 0.2 centigrade or thereabouts and is filtered by two sterile micron filters, typically each being a 3 stage filter arrangement. The amount, quality and other characteristics of the carbon dioxide is maintained by an in-line gas analyzer set up for carbon dioxide gas. Control of the distribution of carbon dioxide to the in line type modified sparger for pre-heated ultra heat treated milk is by means of a carbon dioxide control panel which controls the amount of carbon dioxide being delivered to various locations for carbonating the ultra heat treated milk product. Conventional gas control means are employed.

In the event that the amount of carbon dioxide levels or the amount of the carbonation of the pre-heated ultra heat treated milk product is insufficient, suitable sensors connected to the gas analyzer detect this condition so that by means of the control panel, the insufficiently carbonated product can be diverted to be reprocessed through the carbonator in a return loop to a holding tank to be re-pasteurized to be within the specification.

C. (Packaging)

After the pre-heated ultra heat treated milk is carbonated by the process described above either using a carbonator more or less integral with the UHT plant, a separate carbonator or an in line sparging pipe, it is conveyed to an aseptic pressure balanced tank which is specifically designed to settle/pacify the pre-heated carbonated ultra heat treated milk. It is then conveyed to the packaging station where the pre-heated carbonated ultra heat treated milk product is packaged into sterile containers.

Prior to packing the milk, suitable containers such as for example cans or bottles, are sterilized by dry heat such as for example using hot blasts of air heated to a temperature of 150 degrees centigrade directed onto the cans or bottles for about 58 seconds or a chemical (cooled refrigerated) twist rinse sterilizing bath suitable for bottles, including plastic bottles using ultra violet sterilization. The bottles or cans may be additionally sterilized by the injection of nitrogen.

The milk product is maintained at a suitable pH depending on the product, preferably 4.0 to 5.7 during the packaging operations. This suitable pH levels keep the pre-heated ultra heat treated milk from approaching or going below the isoelectric point of the milk and thus avoiding the unwanted destabilization and or foaming experienced by the prior art. Just prior to filling, the sterilized containers are purged with sterilized purified carbon dioxide and or nitrogen. Typically, the packages into which the carbonated milk is packed are bottles, cans, plastic containers, either rigid or flexible. Additionally, the caps, tops, lids, closure means or the like are either separately or simultaneously sterilized by any suitable or convenient method.

After packaging the milk product into individual containers, the milk may be further sterilized by non-toxic radiation or pasteurization. The filling operations is by means of a modified counter pressure aseptic filler conveniently housed in a clean environment, The finished packages are then pressure checked, product coded, boxed into cartons and the cartons are warehoused accordingly.

A general flow chart for the typical embodiment of the invention described herein is illustrated in FIG. 1 at 100. As shown in the chart, the milk 110 is preheated 120 before it undergoes UHT treatment 130. The milk is then cooled 140. In the next step, flavor is added 150, followed by carbonization 160. The product is then placed in sterile packaging 170.

Figure 2:
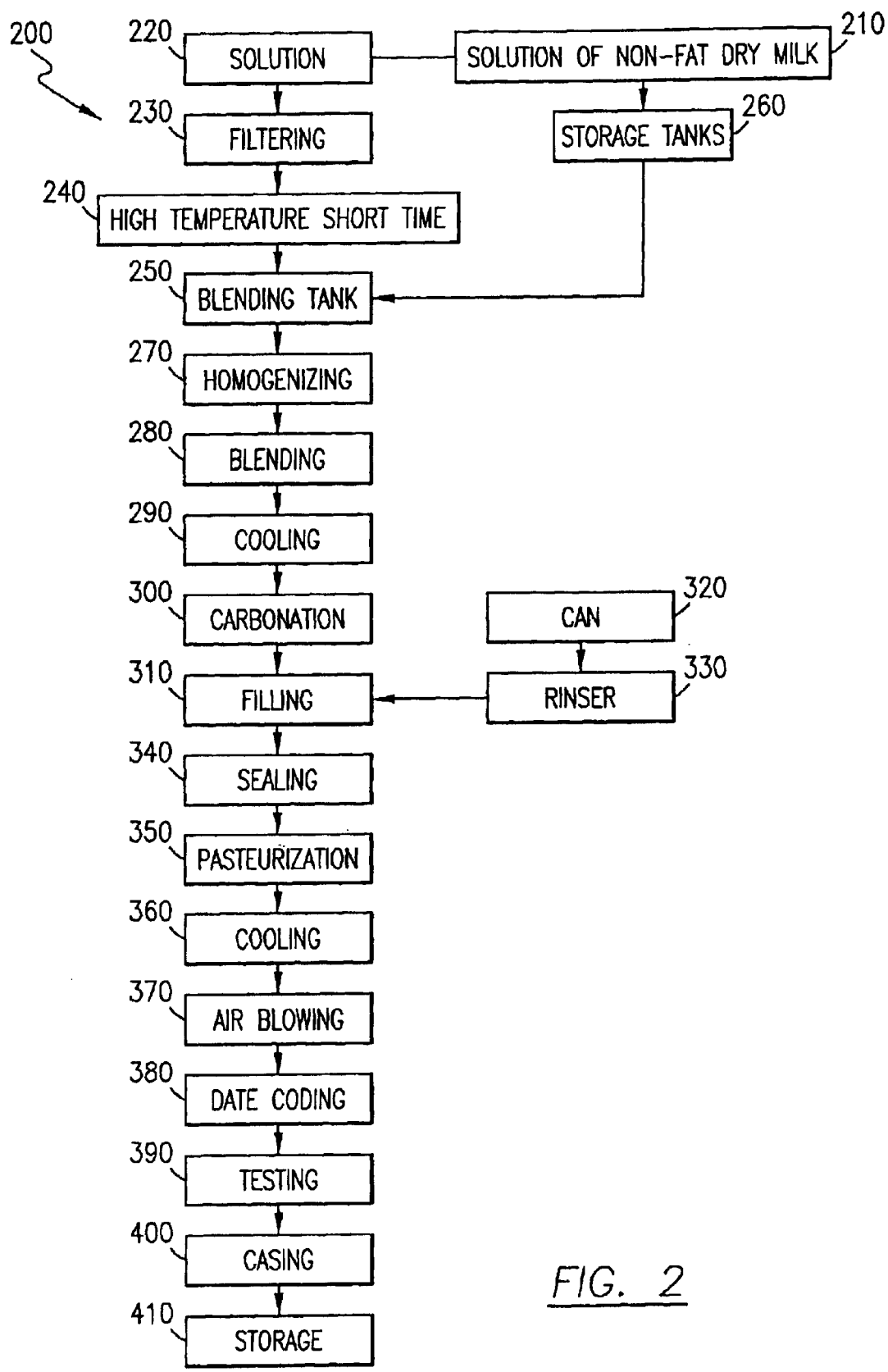
FIG. 2 is a flow chart of the preferred embodiment of the invention.

A general flow chart for the preferred embodiment is shown in FIG. 2 at 200. First, a solution of non-fat dry milk is created 210 and introduced to the process 220 in the main tank. Then there is a first microfiltering step 230 of the raw milk solution. This pretreatment filtering step removes microorganisms and proteases before the UHT treatment. This step improves the flavor and the texture of the final product. The solution is then pre-heated and given UHT treatment at a high temperature for a short time 240. The solution 220 is then put in a blending tank 250. As desired, flavorings, added vitamins, preservatives and other added ingredients found in one or more storage tanks 260 are added to the solution in the blending tank 250. As described below, the additions are preferably added sequentially.

Next, the product is homogenized 270 and put through a final blending process 280. The product is then cooled 290 and carbonated 300. Next the product is put through a filling process 310 into a container. In the preferred embodiment, the product is placed in cans 320 after they have been placed through a rinser 330. One inside the container, the product is cooled 360. The cooling is preferably accelerated by an air blowing step 370. The containers are then coded 380. Coding 380 may include date coding, plant coding and batch coding. The product is preferably then tested 390, especially to determine if it has the proper pH. The product is then cased 400 and sent to storage 410 if desired.

In the blending tank, ingredients are preferably added in sequence and are each mixed at a low shear speed. Sugar and corn syrup are added and mixed for a minimum of five minutes. Flavorings and colors are added next and mixed for a minimum of five minutes. Calcium supplementation and vitamin supplementation are added next and mixed for a minimum of two minutes. Phosphoric acid and citric acid are added next and mixed for a minimum of two minutes. Preservatives and stabilizers are added next and mixed for a minimum of five minutes.

The blended mixture is then homogenized under high pressure of approximately 2,000 psi to 5,000 psi for approximately 5 minutes. After homogenization, the mixture is blended again for a minimum of five minutes to ensure even viscosity and stabilization of the milk proteins. The mixture is then cooled, followed by carbonization. The carbonated mixture is then sent to the filling station, sealed, pasteurized and cooled.

Calcium benzoate is the preferred calcium supplementing agent, although other agents such as calcium picolinate, calcium aspartate, calcium gluconate, calcium ascorbate, calcium glutamate and calcium palimate may be used. The preferred sugar is commercially available granulated extra fine sugar; however, other sweeteners such as crystalline fructose and fructose polymers, glucose, saccharine, sucrose, sucralose and aspartme may be used.

It is also preferred that vitamin supplementation is made with Vitamin A, Vitamin C and Vitamin D. The vitamins may also be added sequentially.

The preferred preservative is benzoic acid, although equivalent preservatives such as sodium benzoate, potassium benzoate and calcium benzoate may be used. The preferred stabilizer is kappa-carageenan.

Using the above described steps, the product made is of a flavor and consistency which has never been known before. Children have found this nutritious product to be tastier than any known similar product. Thus, the subject product is more fun, healthy, and tasty for children than any product of the prior art.

While the process can be made for unflavored product, or any flavor at all, three flavors have had heretofore previously unknown success in flavorfulness: lemon-vanilla, strawberry and orange. The lemon vanilla flavor preferably has a sweetness of approximately 12.6° on the Brix scale. The added flavoring preferably has a total acidity of approximately 26.6 gm/L. Also, the preferred amount of carbonation in the final product is 2.2% volume of $CO_2$, with a total acidity of approximately pH 3.5 +/−0.05. Also for a 250 ml can of the final lemon vanilla flavored product, the contents generally comprise those listed in Table 1, in the general proportions stated.

TABLE 1

| LEMON VANILLA FLAVORED BEVERAGE | | |
|---|---|---|
| RAW MATERIAL | CONTENTS (G) | RATIO (%) |
| Skimmed Milk Powder | 2.39080 | 0.91000 |
| Sugar | 15.10004 | 5.74747 |
| Corn Syrup | 20.13340 | 7.66330 |
| Citric Acid | 0.34732 | 0.13220 |
| Phosphoric Acid | 0.07882 | 0.03000 |
| Vitamin A | 0.01540 | 0.00586 |
| Vitamin D | 0.00402 | 0.00153 |
| Flavor | 0.26887 | 0.10234 |
| Liquified Carbon Dioxide | 2.16073 | 0.82243 |
| Water | 222.22560 | 84.58486 |
| TOTAL | 262.72500 | 100.00000 |

The strawberry flavor preferably has a sweetness of approximately 12.0° on the Brix scale. The added flavoring preferably has a total acidity of approximately 21.3 gm/L. Also, the preferred amount of carbonation in the final product is approximately 2.2% volume of CO2, with a total acidity of approximately pH 3.5 +/−0.05. Also for a 250 ml can of the final strawberry flavored product, the contents generally comprise those listed in Table 2, in the general proportions stated.

TABLE 2

STRAWBERRY FLAVORED BEVERAGE

| RAW MATERIAL | CONTENTS (G) | RATIO (%) |
|---|---|---|
| Skimmed Milk Powder | 1.83470 | 0.70000 |
| Sugar | 14.59394 | 5.56808 |
| Corn Syrup | 19.45859 | 7.42411 |
| Citric Acid | 0.28126 | 0.10731 |
| Phosphoric Acid | 0.05242 | 0.02000 |
| Vitamin C | 0.02621 | 0.01000 |
| Vitamin A | 0.01541 | 0.00588 |
| Vitamin D | 0.00401 | 0.00153 |
| Natural Food Color | 0.03932 | 0.01500 |
| Flavor | 0.44806 | 0.17095 |
| Liquified Carbon Dioxide | 2.16073 | 0.82439 |
| Water | 223.18535 | 85.15275 |
| TOTAL | 262.10000 | 100.00000 |

The orange flavor preferably has a sweetness of approximately 12.0° on the Brix scale. The added flavoring preferably has a total acidity of approximately 21.0 gm/L. Also, the preferred amount of carbonation in the final product is approximately 2.2% volume of CO2, with a total acidity of approximately pH 3.5 +/−0.05. Also for a 250 ml can of the final orange flavored product, the contents generally comprise those listed in Table 3, in the general proportions stated.

TABLE 3

ORANGE FLAVORED BEVERAGE

| RAW MATERIAL | CONTENTS (G) | RATIO (%) |
|---|---|---|
| Skimmed Milk Powder | 2.38511 | 0.91000 |
| Sugar | 14.30432 | 5.45758 |
| Corn Syrup | 19.0724 | 7.27677 |
| Citric Acid | 0.24425 | 0.09319 |
| Phosphoric Acid | 0.07863 | 0.03000 |
| Vitamin C | 0.02621 | 0.01000 |
| Vitamin A | 0.01541 | 0.00588 |
| Vitamin D | 0.00401 | 0.00153 |
| Natural Food Color | 0.02359 | 0.00900 |
| Flavor | 0.29059 | 0.11087 |
| Liquified Carbon Dioxide | 2.16075 | 0.82440 |
| Water | 223.49472 | 85.27078 |
| TOTAL | 262.10000 | 100.00000 |

Also, for the optimum flavor profile, the lemon vanilla flavoring is preferred to be a combination of the following flavor ingredients available from the Lotte Chilsung Beverage Company in Korea: Soda Flavoring No. 228, Soda Flavoring No. 87A-341, Givavdan NK-1200 and Hyvong-Base-T. The strawberry flavoring is preferred to be a combination of Soda Flavoring No. 228, Givavdan NK-1300, Hyvong-Base-T, Nocke 96-0985-D and Q61129.

Conclusion, Ramification and Scope of the Invention

Accordingly, the reader will see that a carbonated pre-heated and pressurized ultra heat treated (UHT) milk beverage of the inventor provides a solution to:

aerating or carbonating a pre-heated and pressurized ultra heat treated milk product comprising introducing a carbon dioxide~as or mixture of gases under pressure into a milk product.

maintaining the pre-heated ultra heat treated milk product in an aerated or carbonated state and packaging the aerated or carbonated milk product into a shelf stable non-refrigerated package.

the destabilization effect (frothing and foaming) which occurs when milk is carbonated.

Those skilled in the art will appreciate that the invention described herein is susceptible to variations and modifications other than those specifically described. It is understood that the invention includes all such variations and modifications which fall within its spirit and scope.

What is claimed is:

1. A method of aerating or carbonating a shelf stable pre-heated and pressurized ultra heat treated milk dairy liquid product to a high level of carbonization while not destabilizing the shelf stable pre-heated milk liquid dairy product, comprising:

(1) pre-heating the milk liquid dairy product within a temperature/time range of at least 85 to 138 degrees centigrade for a time period of approximately 5 seconds;

(2) ultra heating the milk liquid dairy product within a temperature/time range of at least 150 degrees centigrade where it is held at a pressure of 700 KPA or a pressure sufficient for killing microorganisms including pathogens and bacteria and flavoring the liquid dairy product, whereby any flavoring ingredient, acidifying ingredient and preservative ingredient is introduced sequentially to the liquid dairy product and each ingredient is individually mixed before the next ingredient is added;

(3) cooling the liquid dairy product to a temperature of less than about 10 degrees centigrade;

(4) subjecting the cooled liquid dairy product to pressurized carbon dioxide from a carbonator at sufficient pressures and for a sufficient time such that the taste and mouth feel of carbonated liquid dairy product is no longer that of the un-carbonated liquid dairy product, provided that at least 3 vols. to 8 vols. of carbon dioxide are dissolved in the liquid dairy product; and (5) packaging the so carbonated liquid dairy product in shelf stable closed containers capable of retaining a degree of carbonation without refrigeration wherein the step of flavoring comprises the sequential steps of:

adding sugar and corn syrup and mixing for a minimum of five minutes, adding flavoring and colors and mixing for a minimum of five minutes, adding calcium supplementation and vitamin supplementation and mixing for a minimum of two minutes, adding phosphoric acid and citric acid and mixing for a minimum of two minutes, and adding preservatives and stabilizers and mixing for a minimum of five minutes, wherein the calcium supplementation includes calcium benzoate, the preservatives includes benzoic acid, and the stabilizers includes kappa-carrageenan.

2. A method according to claim 1, in which the pre-heated ultra heat treated milk product is whole milk, skim milk, low fat milk, total milk solids, modified milk, non-fat milk, soy milk, non-fat soy milk, or any other milk product either essentially natural or essentially artificial.

3. The process of claim 1 wherein the pre heated and pressurized ultra heat treated carbonated liquid dairy product is at a PH level of between 3.8 and 5.7 and the carbonated liquid dairy product is not destabilized.

4. The process of claim 1 wherein the liquid milk product is pre heat treated in a plate heat exchange or a comparable industry standard apparatus.

5. The process of claim 1, wherein the pre heated liquid milk product is ultra heated in an ultra heat treatment apparatus.

6. The process of claim 1, wherein the pre heated and ultra heated liquid milk product is cooled to 2 degrees centigrade.

7. The process of claim 4, wherein the liquid milk product which is at 4–8 degrees centigrade is pre heated to a temperature of 65 to 85 degrees centigrade.

8. The process of claim 1, wherein the pre-heated ultra heat treated liquid milk product is homogenized.

9. The process of claim 1, wherein flavoring is added in the liquid milk product before packaging.

10. The process of claim 9 wherein flavoring is added after the ultra beat treatment process.

11. The process of claim 9 wherein flavoring can he chocolate, vanilla, strawberry, malt and any other flavor desired.

12. The process of claim 1 in which the pre heated and pressurized ultra heat treated milk is carbonated by a carbonator comprising a direct injection of sterilized, purified carbon dioxide gas or gas mixture.

13. The process of claim 12 in which the carbonator is substantially integral with the ultra heat treatment apparatus.

14. The process of claim 12 in which the supply of carbon dioxide from the carbonator is from 11 to 56 kg per hour at a pressure in the range from 50 KPa to 200 KPa.

15. The process, of claim 14 in which the injector of the carbonator has an adjustable needle-like valve.

16. The process of claim 15 in which the carbonator has an injection tube part of which is located in a tube for injecting carbon dioxide perpendicularly to the direction of flow of milk in the tube.

17. The process of claim 16 in which the amount of carbonation is in the range of from 3 vols to 8 vols.

18. The process of claim 12 in which the carbonation takes place at about 0 to 5 degrees centigrade, preferably 2 to 1 degrees centigrade.

19. The process of claim 18 in which the carbonated milk product is maintained in a pressurized carbonator holding tank or settling tank in order to facilitate the carbonated milk product to mature and saturate.

20. The process of claim 19 in which the holding or settling tank is maintained at a pressure of 459 KPA and a temperature of from 2 to 6 degrees centigrade.

21. The process of claim 12 in which the carbonated milk product is packaged into sterile containers.

22. A method of aerating or carbonating a shelf stable pre-heated and pressurized ultra heat treated milk dairy liquid product to a high level of carbonization while not destabilizing the shelf stable pre-heated milk liquid dairy product, comprising:

(1) pre-heating the milk liquid dairy product within a temperature/time range of at least 85 to 138 degrees centigrade for a time period not in excess of 5 seconds;

(2) ultra-heating the milk liquid dairy product within a temperature time range of at least 150 degrees centigrade for an appropriate time required to kill at least one of a list of harmful agents including microorganisms, pathogens and bacteria where it is held at a pressure of 700 KPA or an appropriate pressure required to kill at least one of a list of harmful agents including microorganisms, pathogens and bacteria, and flavoring the liquid dairy product, whereby any flavoring ingredient, acidifying ingredient and preservative ingredient is introduced sequentially to the liquid dairy product and each ingredient is individually mixed before the next ingredient is added;

(3) homogenizing the liquid dairy product;

(4) cooling the liquid dairy product to a temperature of less than about 10 degrees centigrade;

(5) subjecting the cooled liquid dairy product to pressurized carbon dioxide from a carbonator at sufficient pressures and for a sufficient time such that the taste and mouth feel of carbonated liquid dairy product is no longer that of the un-carbonated liquid dairy product, provided that at least 3 vols. to 8 vols. of carbon dioxide are dissolved in the liquid dairy product, and;

(6) packaging the so carbonated liquid dairy product in shelf stable closed containers capable of retaining the degree of carbonation without refrigeration, wherein the step of flavoring comprises the sequential steps of:

adding sugar and corn syrup and mixing for a minimum of five minutes, adding flavoring and colors and mixing for a minimum of five minutes, adding calcium supplementation and vitamin supplementation and mixing for a minimum of two minutes, adding phosphoric acid and citric acid and mixing for a minimum of two minutes, and adding preservatives and stabilizers and mixing for a minimum of five minutes, wherein the calcium supplementation includes calcium benzoate, the preservatives includes benzoic acid, and the stabilizers includes kappa-carrageenan.

23. The process of claim 22, wherein the flavoring is lemon vanilla and comprises a sweetness of 12.6° on the Brix scale and a total acidity of 26.6 gm/L, and wherein the total carbonation of the final product is 2.2% by volume.

24. The process of claim 22, wherein the flavoring is strawberry and comprises a sweetness of 12.6° on the Brix scale and a total acidity of 21.3 gm/L, and wherein the total carbonation of the final product is 2.2% by volume.

25. The process of claim 23, wherein the flavoring comprises Soda Flavoring No. 228, Soda Flavoring No. 87A-341, Givavdan NK-1200 and Hyvong-Base-T.

26. The process of claim 24, wherein the flavoring comprises Soda Flavoring No. 228, Givavdan NK-1300, Hyvong-Base-T, Nocke 96-0985-D and Q-61129.

27. The process of claim 22, wherein the process begins with the step prefiltering micro-organisms and proteases.

* * * * *